United States Patent
Inoue et al.

(10) Patent No.: US 6,379,839 B1
(45) Date of Patent: *Apr. 30, 2002

(54) BATTERY HAVING WELDED LEAD PLATE

(75) Inventors: Hiroyuki Inoue, Mihara-gun; Masayuki Terasaka, Tsuna-gun; Nobukazu Yamanishi, Sumoto; Shinichirou Matsue, Sumoto; Hiroshi Hosokawa, Sumoto, all of (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,283

(22) Filed: Aug. 27, 1999

(30) Foreign Application Priority Data

Aug. 31, 1998 (JP) ............................................. 10-245119

(51) Int. Cl.⁷ ........................... H01M 2/02; H01M 2/20; H01M 2/22
(52) U.S. Cl. ......................... 429/176; 429/94; 429/161; 429/163; 429/164; 429/211
(58) Field of Search ........................ 429/94, 163–170, 429/176, 211, 161

(56) References Cited

U.S. PATENT DOCUMENTS

| 4,239,837 A | * 12/1980 | Hartmann et al. | 429/104 |
| 4,767,682 A | * 8/1988 | Dorogi et al. | 429/94 |
| 5,443,925 A | * 8/1995 | Machida et al. | 429/94 |
| 5,916,707 A | * 6/1999 | Omaru et al. | 429/163 |
| 6,139,986 A | * 10/2000 | Kurokawa et al. | 429/61 |

FOREIGN PATENT DOCUMENTS

| JP | 4-162351 | 6/1992 |
| JP | 8-293299 | 11/1996 |

* cited by examiner

Primary Examiner—Gabrielle Brouillette
Assistant Examiner—Jonathan Crepean
(74) Attorney, Agent, or Firm—Wenderoth, Lind & Ponack, L.L.P.

(57) ABSTRACT

The battery has an electrode assembly inserted into a cylindrical external case. A lead plate connected to the electrode assembly is weld attached to the inner surface of the external case by an energy beam applied from outside the external case. The external case has a projection jutting from its inner surface. The energy beam is applied to the projection from outside the external case and weld attaches the lead plate to the inner surface of the projection.

21 Claims, 7 Drawing Sheets

BATTERY HAVING WELDED LEAD PLATE

This application is based on application No. 10-245119 filed in Japan on Aug. 31, 1998, the content of which incorporated hereinto by reference.

BACKGROUND OF THE INVENTION

This invention relates to a battery in which a lead (an electrically conducting lead, not the element Pb) plate connected to an electrode assembly is welded to the bottom plate of an external case by an energy beam such as a laser.

The following describes fabrication of a prior art battery in which a lead plate connected to an electrode assembly is welded to the bottom plate of an external case.

(1) A laminate of positive electrode plate, negative electrode plate, and separator in between, is rolled into a spiral shape to form the electrode assembly. The spiral shaped electrode assembly is formed with a center hole to insert an electrode rod for weld connection.

(2) The electrode assembly is inserted into a circular cylindrical external case with a bottom.

Figure 1:
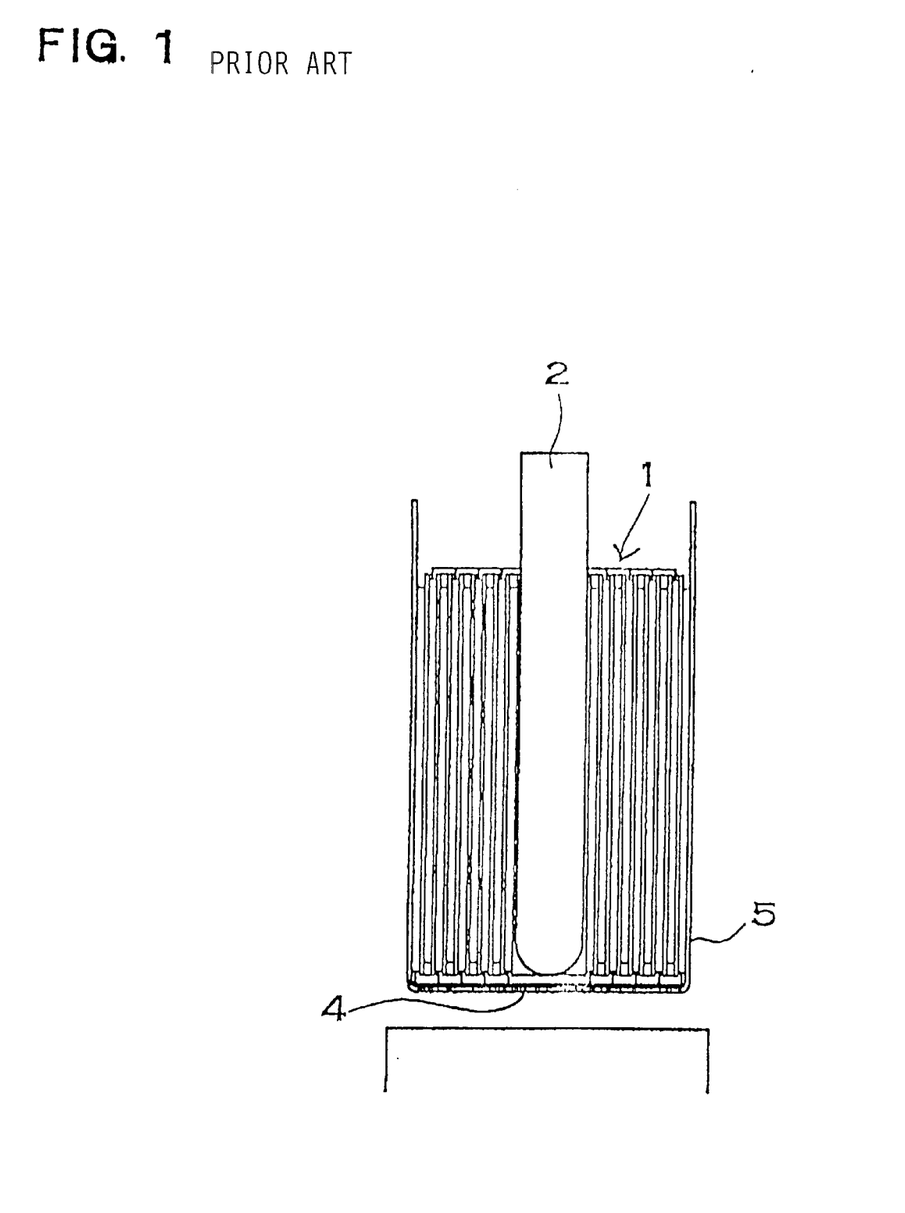
FIG. 1 is a cross section view showing a prior art battery fabrication method.

(3) A lead plate connected to the bottom of the electrode assembly is weld attached to connect it to the bottom of the external case. As shown in FIG. 1, an electrode rod 2 for weld connection is inserted into the electrode assembly 1 center hole, and the lead plate 4 is pushed by the electrode rod 2 against the bottom plate of the external case 5 and welded.

(4) A lead plate which draws out of the top of the electrode assembly 1 is connected to an electrode on a sealing lid which closes off the opening at the top of the external case 5. After the external case is filled with electrolyte, the sealing lid is fixed to the opening in the external case. The external case is sealed in an airtight fashion by the sealing lid.

This process has the characteristic that the lead plate 4 connected to the electrode assembly 1 can be reliably welded and fixed to the bottom plate of the external case 5. However, a battery of this configuration must be provided with a center hole in the middle of the electrode assembly 1, and this center hole must have a diameter larger than the electrode rod for weld connection. Therefore, the actual volume of the electrode assembly is reduced and the battery's capacity is decreased. Increasing battery capacity by reducing the size of the electrode assembly center hole may be considered, but when center hole size is reduced, fitting the electrode rod in the center hole becomes a problem.

Figure 2:
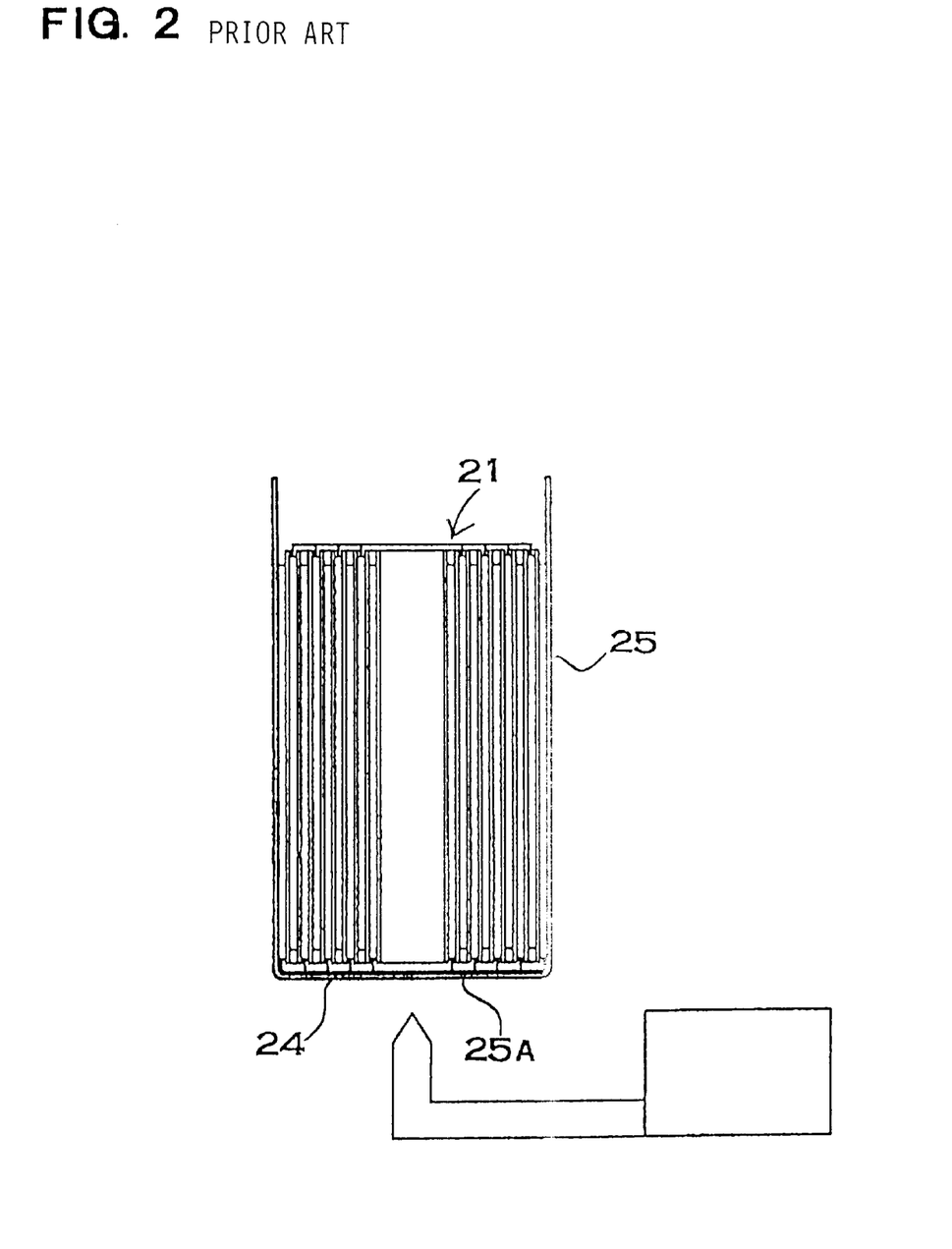
FIG. 2 is a cross section view showing another fabrication method of a prior art battery.

Technology for connecting a lead plate to the bottom of an external case by laser welding from outside the case has been developed to eliminate the drawbacks of a battery with the configuration described above (Japanese Non-examined Patent Publications No. 4-162351 issued on Jun. 5, 1992 and No. 8-293299 issued on Nov. 5, 1996). These and other disclosures cite batteries which do not use an electrode rod for weld connection. As shown in FIG. 2, an energy beam such as a laser is applied to the bottom plate 25A of the external case 25 from outside the case. The energy beam fuses a portion of the bottom plate 25A and the lead plate 24 to weld and attach the lead plate 24 to the bottom plate 25A.

As shown in FIG. 2, there is no need to provide a center hole in the electrode assembly 21 of a battery in which an energy beam, such as a laser beam, is applied from outside the case to weld the lead plate to the bottom plate. Consequently, this type of battery has the characteristic that the actual electrode assembly volume and battery discharge capacity can be increased. However, in this type of battery in which the lead plate is welded from outside the external case, the lead plate can fail to reliably weld to the bottom plate. For example, with the electrode assembly inserted into the external case, if the lead plate is separated from the bottom plate, the bottom plate of the external case will fuse but the lead pipe will not, and the energy beam will not be able to reliably weld the lead plate to the bottom plate. In addition, if foreign material or contamination is between the lead plate and bottom plate, the energy beam will also fail to make a reliable weld. In particular, whether or not the lead plate is welded to the bottom plate and what kind of attachment is made, cannot be determined from outside this type of battery. Since evaluation of battery quality is difficult, it is extremely important to make weld attachments more reliably.

This invention was developed to solve these types of problems. It is thus a primary object of the present invention to provide a battery that can reliably weld a lead plate do an external case.

The above and further objects and features of the invention will more fully be apparent from the following detailed description with accompanying drawings.

SUMMARY OF THE INVENTION

The battery has an electrode assembly inserted into a cylindrical external case. A lead plate connected to the electrode assembly is welded to the inner surface of the external case by an energy beam applied from outside the external case.

Further, the battery of the present invention is provided with a projection which projects from the inner surface of the external case. An energy beam is applied to the projection from outside the external case to weld attach the inner surface of the projection to the lead plate.

A battery of this configuration has the characteristic that the lead plate can be reliably welded to the external case. This is because the projection in the external case makes reliable contact with the lead plate. The external case and lead plate can be reliably welded by application of an energy beam, such as a laser, to the projection which has its inner surface in contact with the lead plate. In particular, a battery, in which the lead plate and external case can be reliably contacted and welded, also reliably prevents separation of the lead plate and external case due to mechanical shock.

In the battery of the present invention, the projection is disposed in a still more preferable arrangement for contact and weld to the lead plate by curving the projecting surface to its center or by making a conical shaped projection.

Further, the lead plate of the battery can be provided with a flexible deforming piece, and the projection in the external case can be welded to this flexible deforming piece. In addition, the flexible deforming piece can jut outwards towards the projection in the external case to further improve connection of the lead plate and the external case.

Anti-corrosive coating can be used to coat the region of the battery where the energy beam is applied from outside the external case. This effectively prevents corrosion of the region of energy beam application, and contact resistance problems can be avoided via the anti-corrosive coating.

DETAILED DESCRIPTION OF THE INVENTION

Figure 3:
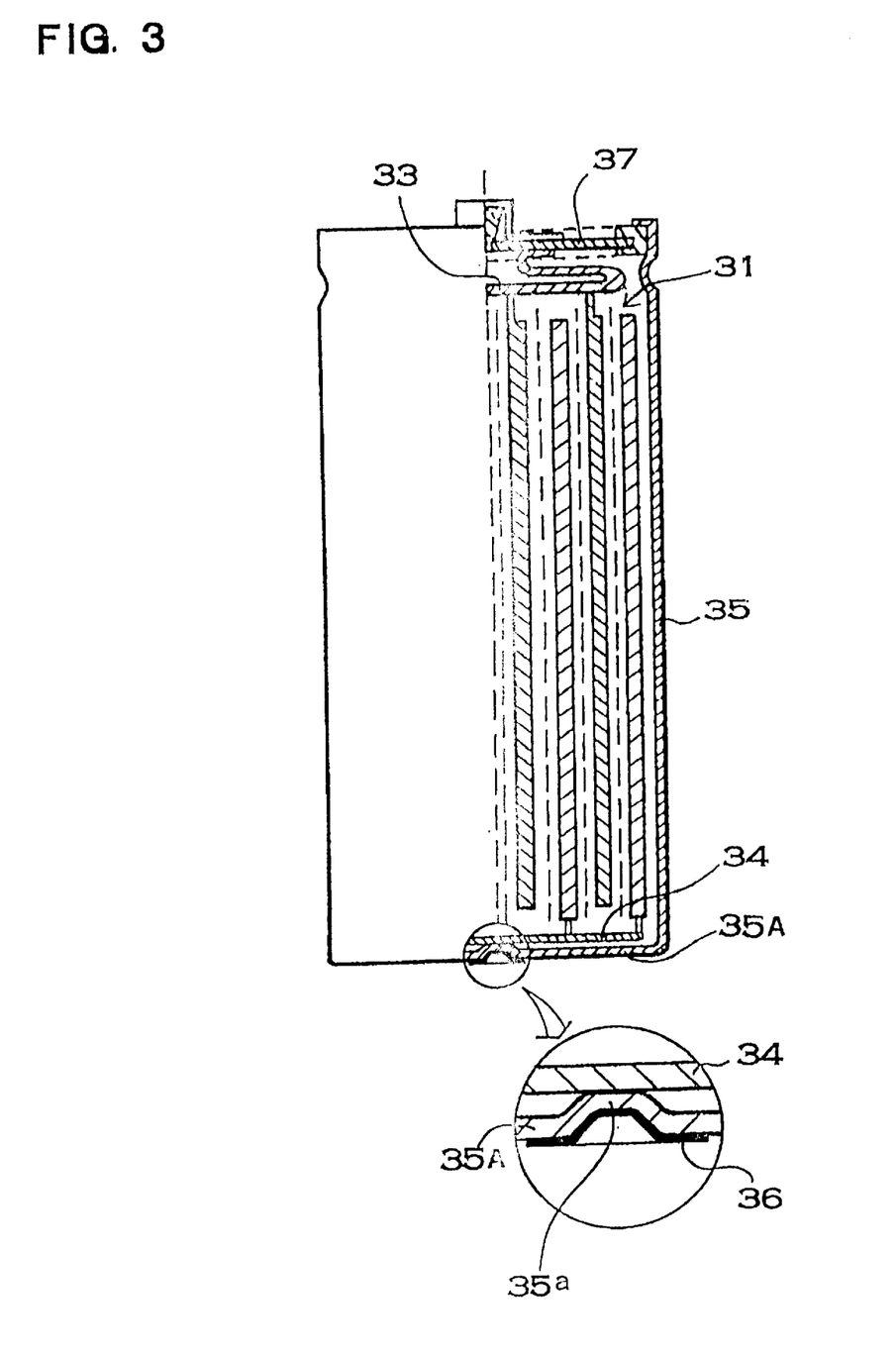
FIG. 3 is a cross section view showing an embodiment of a battery of the present invention.

The battery shown in FIG. 3 is a rechargeable battery such as a nickel hydride battery, a nickel cadmium battery, or a lithium ion battery, and is provided with a circular cylindrical external case 35, an electrode assembly 31 for insertion into this external case 35, and lead plates 33, 34 for connecting the electrode assembly 31 to the external case 35. Although the external case of the battery shown in FIG. 3 has a circular cylindrical shape, the external case of the battery of the present invention is not limited to a circular cylindrical shape. Although not illustrated, the external case may also take on, for example, a rectangular cylindrical shape or an elliptical cylindrical shape.

The external case 35 is made of iron or steel with nickel plated surfaces. The material for the external case 35 is the optimum metal selected considering the type of battery and its characteristics. For example, the external case 35 may also be made of stainless steel, aluminum, or aluminum alloy. The open region at the upper end of the metal external case 35 is sealed closed in an airtight fashion by the sealing lid 37. The sealing lid 37 of FIG. 3 is fixed in place on the external case 35 in an electrically insulating fashion by a caulked junction structure. The sealing lid may also be fixed on the external case in an airtight fashion by a method such as laser welding. This configuration of sealing lid insulates and holds an electrode stationary. The sealing lid 37 fixes one terminal of the battery in place.

Figure 4:
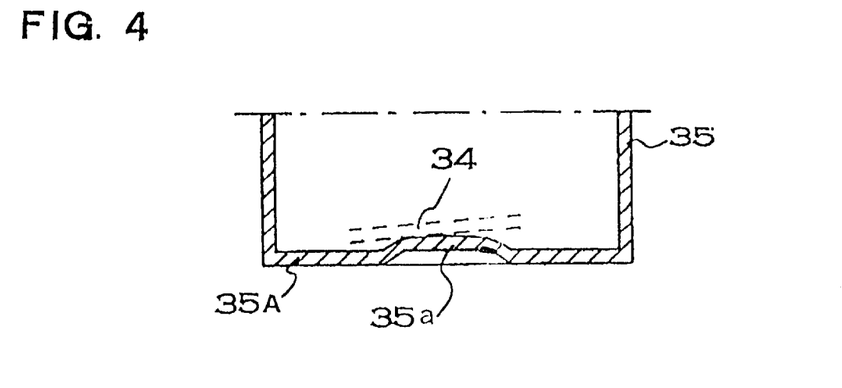
FIG. 4 is a cross section view showing the bottom of the external case of the battery shown in FIG. 3.
Figure 6:
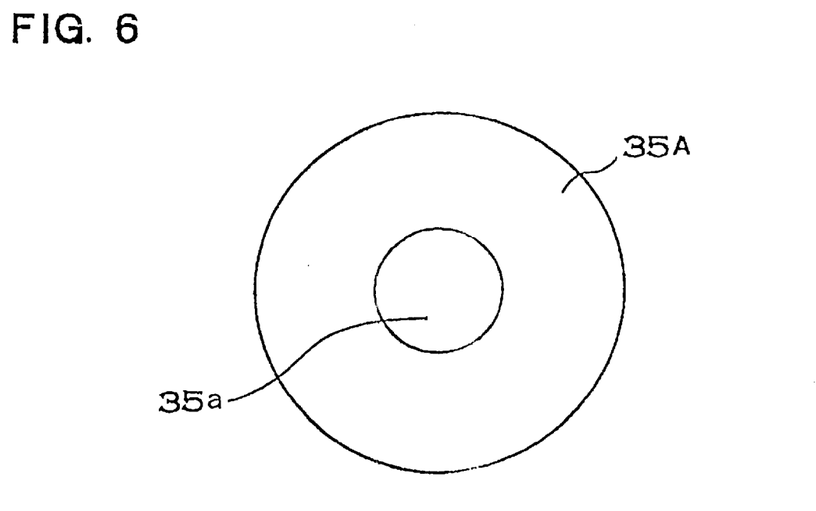
FIG. 6 is a bottom view of the external case shown in FIG. 4.
Figure 7:
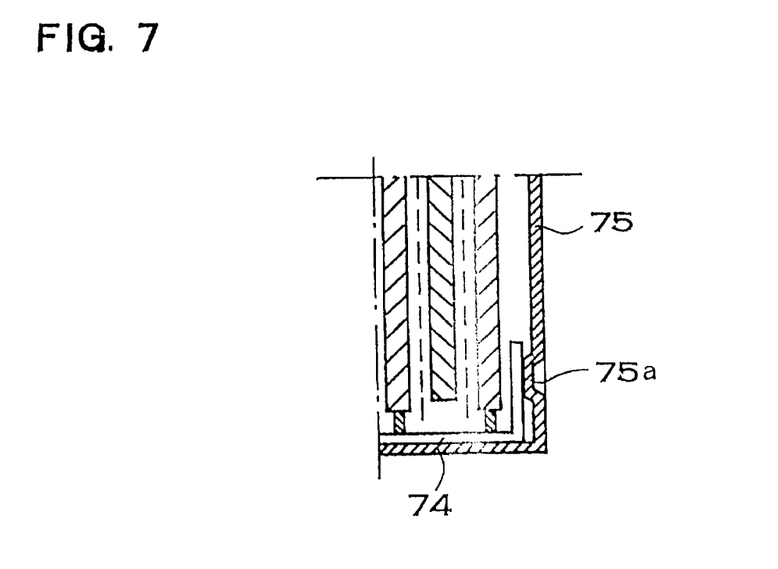
FIG. 7 is a cross section view showing the bottom region of a battery of another embodiment of the present invention.

As shown in FIGS. 3 and 4, the external case 35 is provided with a projection 35a in the region where the lead plate 34 is welded and fixed to the external case 35. A projection 35a is provided on the bottom plate 35A of the external case 35 of the battery shown in the figures, and the lead plate 34 is welded to this projection 35a. As shown in the bottom view of FIG. 6, the external case 35 is provided with a projection 35a at the center of the bottom plate 35A. An external case 35 provided with a projection 35a in this location has the characteristic that the location for welding of the lead plate 34 by an energy beam operation such as laser welding can be easily and accurately aligned. This is because the location for energy beam weld attachment of the lead plate 34 does not change regardless of the position to which the external case 35 has rotated. However, there is no requirement to locate the projection at the center of the bottom plate. Further, the projection is not required to be provided on the bottom plate. For example, as shown in FIG. 7, the projection may also be provided on a side-wall of the external case 75. However, regardless of where the projection is provided, the lead plate 74 is welded to the projection 75a.

The outside diameter of the projection 35a is designated to an optimum value considering the area of the weld. If the diameter of the projection 35a is made small, the top of the projection can be reliably welded to the lead plate. However, if the projection diameter is too small, the weld area between the lead plate and the external case becomes smaller.

Making the projection 35a jut high up from the inner surface of the external case 35 improves the situation for welding of the projection 35a and the lead plate 34. However, making the projection 35a project high upwards pushes the electrode assembly 31, which inserts into the external case 35 upwards. Consequently, this makes it necessary to reduce the height of the electrode assembly 31, and this reduces the real capacity of the electrode assembly.

Figure 5:
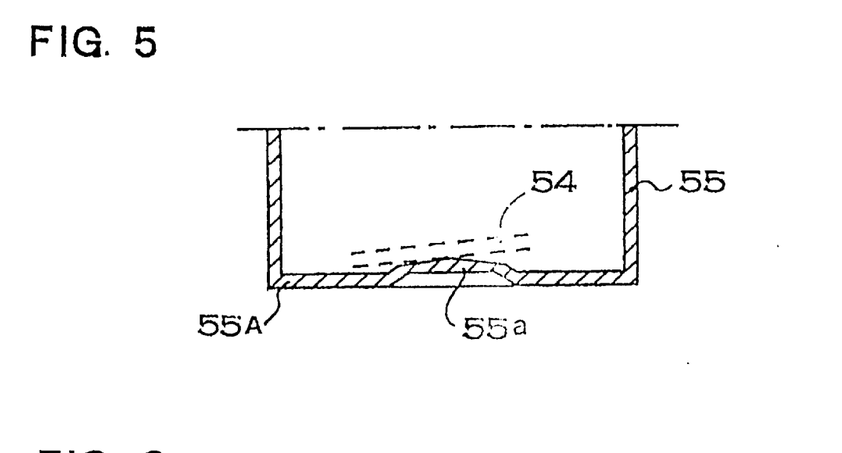
FIG. 5 is a cross section view showing the bottom of the external case of a battery of another embodiment of the present invention.

As shown in FIG. 4, the projection 35a is shaped with its convex surface curved around the central protrusion. Or, as shown in FIG. 5, the projection 55a protrudes outward in a conical shape. In a battery with a projection having a protruding surface in one of these configurations, the lead plate 54 contacts the projection 55a without gaps or voids. Therefore, a battery of this type has the characteristic that the lead plate 54 and projection 55a can be more reliably weld attached. However, the protruding surface of the projection 55a may also be planar.

The electrode assembly 31 is a laminate of a positive electrode plate, a negative electrode plate, and a separator in between. The battery shown in FIG. 3 has a stack of positive electrode plate, negative electrode plate, and intervening separator rolled together. This spiral shaped electrode assembly 31 is inserted into the circular cylindrical external case 35. The spiral electrode assembly 31 may also be pressed from both sides to distort it into an elliptical shape for insertion into an elliptical shaped or rectangular shaped external case. Further, an electrode assembly for insertion into a square cylindrical external case can also be fabricated by cutting a plurality of positive electrode plate and negative electrode plate sheets, and stacking them with separator in between.

The electrode assembly 31 has lead plates 33, 34 connected to the positive and negative electrode plates. The lead plates 33, 34 are disposed at the top and bottom of the electrode assembly 31 and are connected to the positive and negative electrode plates. As shown in FIG. 3, positive and negative electrode plate core material projects upward and downward from the electrode assembly 31, and the lead plates 33, 34 are connected to these projections. In the electrode assembly 31 in the figures, the electrode plate 34 disposed at the bottom of the electrode assembly 31 is connected to the external case 35. The electrode plate 33 disposed at the top of the electrode assembly 31 is connected to the sealing lid 37.

Figure 8:
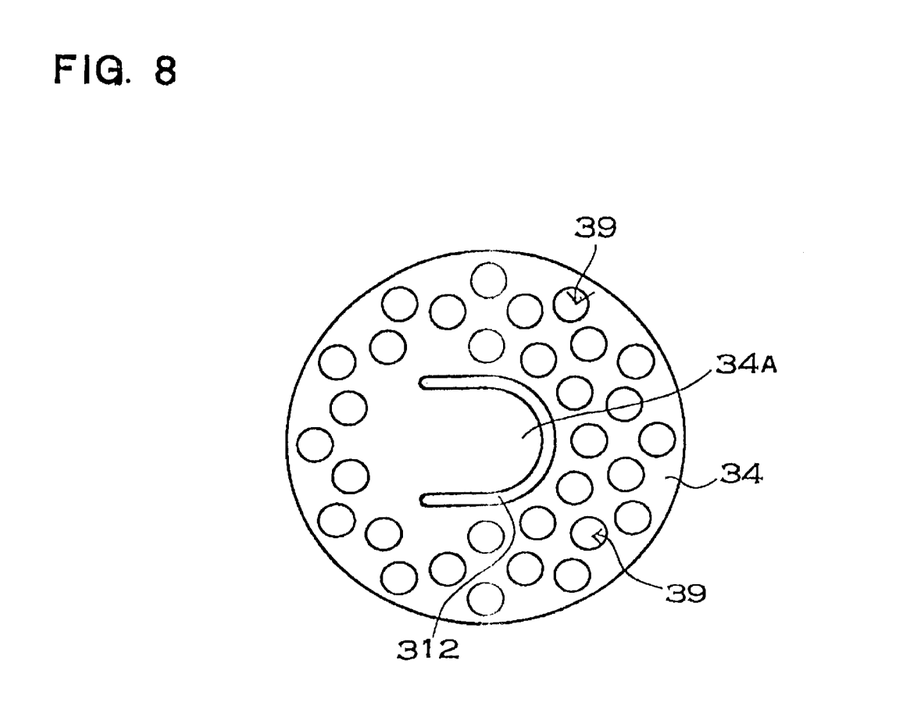
FIG. 8 is a plan view showing the lead plate contained at the bottom of the battery shown in FIG. 3.
Figure 9:
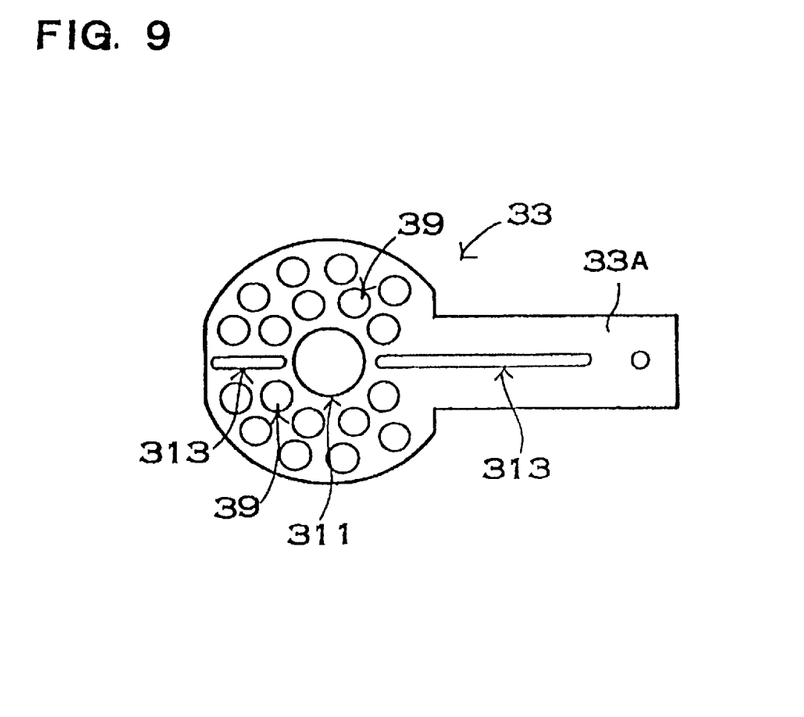
FIG. 9 is a plan view showing the lead plate contained at the top of the battery shown in FIG. 3.

As shown in FIGS. 8 and 9, the lead plates 33, 34, which connect to the top and bottom of the electrode assembly 31, are cut from metal plate in disk shapes smaller than the inside of the external case 35. As shown in FIG. 9, the lead plate 33 which connects to the top surface of the electrode assembly 31 has a lead strip 33A projecting from its periphery. The lead strip 33A connects to the sealing lid 37, which is electrically insulated from, and attaches to the open region of the external case 35. A lead plate 33 of the shape shown in FIG. 9 may also be used to connect the bottom surface of the electrode assembly to a side-wall of the external case.

Figure 10:
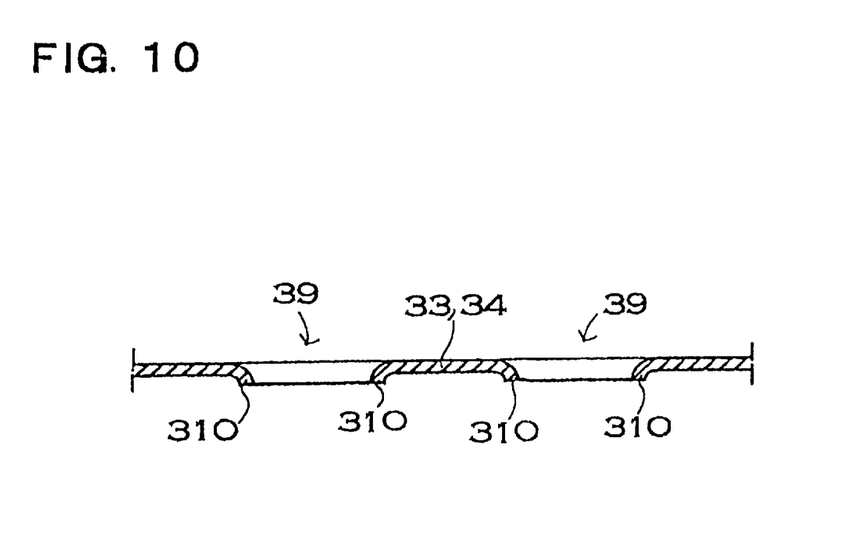
FIG. 10 is an enlarged cross section view of a lead plate.
Figure 11:
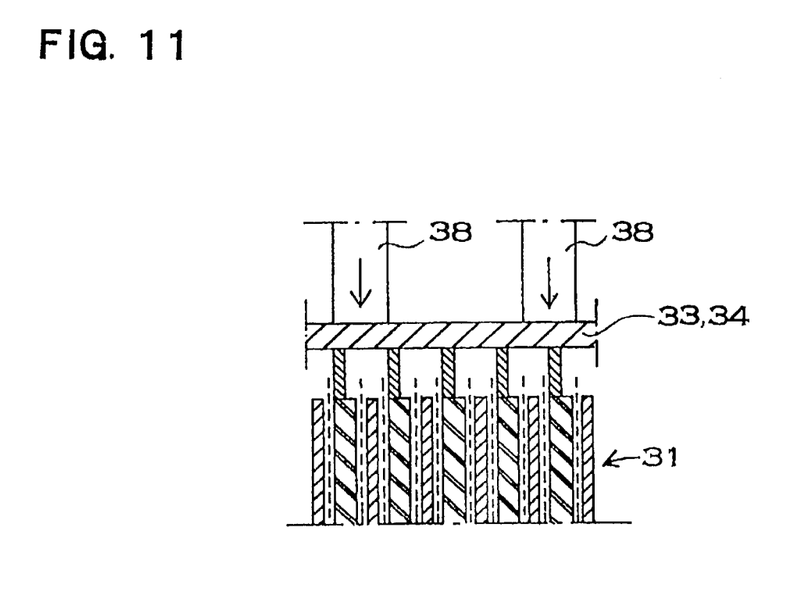
FIG. 11 is a cross section view showing the disposition of a lead plate for welding to an electrode assembly.

As shown in the cross section view of FIG. 11, these types of lead plates 33, 34 are pressed against the electrode assembly 31 via a welding electrode 38, and reliably connected by resistive electric welding. A plurality of holes 39 are opened through the lead plates 33, 34 shown in FIGS. 8 and 9 to reliably connect the lead plates 33, 34 electrically to the electrodes of the electrode assembly 31. As shown in the enlarged cross section view of FIG. 10, projections 310 are provided extending downward from the periphery of the holes 39 in the lead plates 33, 34. The projections 310 are connected to the electrode plates of the electrode assembly. Further, as shown in FIG. 9, the lead plate 33, which connects to the top of the electrode assembly 31, is provided with slits 313 on either side of a center hole 311 to reduce unnecessary electric current during resistive electric welding.

As shown in FIG. 8, the lead plate 34, which connects to the bottom of the electrode assembly 31, is provided with a U-shaped cut-out 312, and a flexible deforming piece 34A is provided inside this cut-out 312. The flexible deforming piece 34A protrudes outwards towards the projection 35a in the external case 35. The flexible deforming piece 34A is approximately at the center of the lead plate 34, and is welded to the external case 35 projection 35a.

Since lead plates 33, 34 in a battery of this configuration can connect to the electrode assembly 31 at a plurality of locations, the battery has excellent high current characteristics. This is because internal resistance can be made small. Further, a battery of this configuration also has the characteristic that the lead plate 34 can be reliably welded to the bottom plate 35A via an energy beam. This is because the electrode assembly 31 can be inserted into the external case 35, and the lead plate 34 can be put in intimate contact with the bottom plate 35A of the external case.

Figure 12:
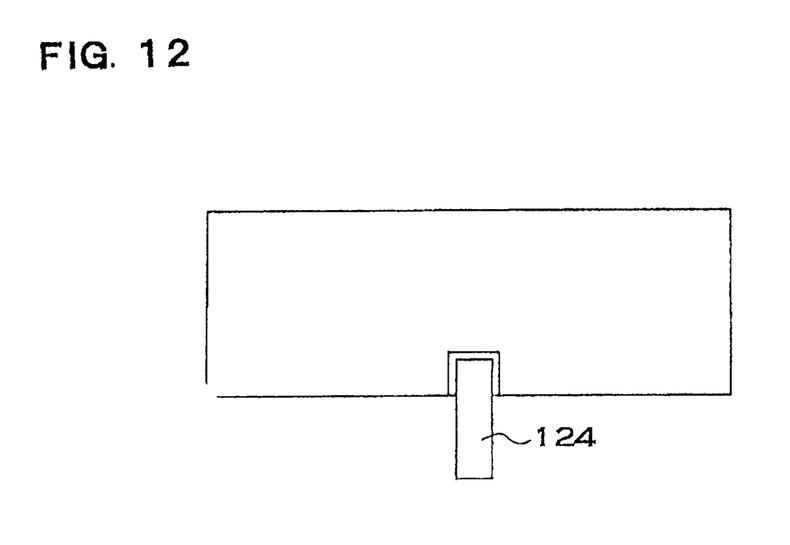
FIG. 12 is a front view showing another type of lead plate for incorporation into a battery of the present invention.

However, the battery of the present invention is not limited to a lead plate, which connects the electrode assembly to the external case, according to the structure described above. For example, the lead plate may also have a band shape as shown in FIG. 12. This lead plate 124 connects to exposed core material of an electrode, extends out from the bottom of the electrode assembly, and its end welds to the inner surface of the external case. This type of lead plate 124 may also extend out from the side of the electrode assembly weld to a side wall of the external case as shown in FIG. 7.

The lead plate 34 is welded to the inner surface of the external case 35. An energy beam such as a laser beam or an electron beam, etc. is used as a method of welding the lead plate 34. The energy beam fuses both the external case 35 and the lead plate 34 to weld the lead plate 34 and the external case 35. As shown in FIG. 4, a laser beam is directed at a wide region, which includes the entire projection 35a, to weld attach the lead plate 34 and the external case 35.

When an energy beam such as a laser beam is applied to the outer surface of the external case 35, corrosion resistant metal plating, which coats the surface of the external case 35, loses its effectiveness. Consequently, the region of energy beam application can easily corrode. This drawback can be eliminated by coating the region of energy beam application with an anti-corrosive coating 36, as shown in the enlarged portion of the cross section view of FIG. 3. However, when anti-corrosive coating 36 is applied to the bottom surface of the external case 35, the anti-corrosive coating 36 can be the cause of contact resistance during battery operation. This is because non-conducting organic coating material is used as the anti-corrosive coating 36. This drawback can be eliminated by mixing conductive material such as carbon or metallic powder into the anti-corrosive coating 36.

The anti-corrosive coating 36 can be sprayed in aerosol form or applied using a paint brush. Further, the anti-corrosive coating 36 may also be sprayed from a miniature nozzle according to ink-jet technology. The ink jet method has the characteristic that a precise thickness of anti-corrosive coating can be applied to the precise location of energy beam application. In addition, the anti-corrosive coating 36 can also be applied at the same time the date of manufacture and the usable date are printed on the external case of the battery by ink-jet.

EMBODIMENTS

[Embodiment 1]

Nickel cadmium batteries were fabricated by the following process, and lead plate to external case connections were tested. An external case provided with a projection 35a in the center of the bottom surface, as shown in FIG. 4, was used. The projection 35a was shaped with its convex surface curved around the central protrusion. The outside diameter of the projection 35a was approximately 2 mm, the height of the projection was 0.2 mm, and the radius of curvature of the protruding surface was 15 mm.

As a lead plate 34, which connects to the bottom surface of the electrode assembly 31, a configuration provided with a flexible deforming piece 34A, as shown in FIG. 8, was used. A flexible deforming piece 34A, which protruded outwards approximately 0.2 mm was used.

An electrode assembly rolled into a spiral shape with a separator between electrodes and lead plates 33, 34 welded to both ends was inserted in the external case 35 with the above configuration. Lead plates 33,34 with a plurality of holes 39 and projections 310 provided at the periphery of the holes 39 were used. The electrode assembly was inserted into the external case, a laser was applied to the indentation corresponding to the projection 35a provided in the bottom surface of the external case, and the lead plate 34 was welded to the external case 35. As a coating on the laser weld region at the outer bottom surface of the external case, Hitachi Manufacturing LTD. [JP-K 28] was applied. After welding the lead plate 33 connected to the top surface of the electrode assembly to the sealing lid 37, an electrolyte was added, and the opening in the external case was closed off with the sealing lid 37 to complete fabrication of a nickel cadmium battery.

[Embodiment 2]

Nickel cadmium batteries were fabricated by the same process as embodiment 1, except the lead plate connected to the bottom surface of the electrode assembly had no flexible deforming piece. The region of the lead plate for welding to the external case was planar for this battery.

COMPARISON EXAMPLE

Nickel cadmium batteries were fabricated by the same process as embodiment 1 except the bottom surface of the external case had no projection.

The following shows comparison of lead plate to external case weld attach success ratios for batteries fabricated as described above.

| | |
|---|---|
| Batteries of Embodiment 1 | 100% |
| Batteries of Embodiment 2 | 98% |
| Batteries of the Comparison Example | 97% |

From these test results, batteries of embodiment 1 and embodiment 2 has lead plates and external cases reliably connected. In particular, there was no failure of the weld between the lead plate and external case for batteries of embodiment 1.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery comprising:
   an electrode assembly;
   an external case having a bottom, an inner surface and an outer surface, said external case surrounding said electrode assembly, said inner surface of said external case having an inwardly protruding projection having a first surface area, said outer surface of said external case having an inwardly protruding recess, said recess located so as to correspond with said projection; and
   a lead plate having a welding surface area, said lead plate being connected to said electrode assembly, and a portion of said welding surface area being welded to said external case at said first surface area of said projection;
   wherein said first surface area is smaller than said welding surface area.

2. A battery comprising:
   an electrode assembly;
   an external case having a bottom, an inner surface and an outer surface, said external case surrounding said electrode assembly, said inner surface of said external case having an inwardly protruding projection having a first surface area, said outer surface of said external case having an inwardly protruding recess, said recess located so as to correspond with said projection; and
   a lead plate having a welding surface area, said lead plate being connected to said electrode assembly, and a portion of said welding surface area being welded to said external case at said first surface area of said projection;
   wherein said lead plate is welded to said external case by an energy beam externally applied to said external case; and
   wherein said first surface area is smaller than said welding surface area.

3. A battery as recited in claim 2, wherein said external case has a cylindrical shape, and said projection is located at the center of the bottom of said external case.

4. A battery as recited in claim 3, wherein said electrode assembly comprises a spiral electrode assembly.

5. A battery as recited in claim 3, wherein a cross-sectional shape of said electrode assembly is elliptical.

6. A battery as recited in claim 5, wherein said electrode assembly comprises a spiral electrode assembly.

7. A battery as recited in claim 2, wherein a cross-sectional shape of said external case is circular.

8. A battery as recited in claim 2, wherein said projection is located on a side-wall of said external case.

9. A battery as recited in claim 2, wherein the cross-sectional shape of said external case is rectangular.

10. A battery as recited in claim 9;
    wherein said electrode assembly comprises a positive electrode plate, a negative electrode plate, and a separator; and
    wherein said positive electrode plate is separated from said negative electrode plate by said separator.

11. A battery as recited in claim 10;
    wherein said electrode assembly comprises a plurality of stacked electrode units;
    wherein each electrode unit in said plurality of stacked electrode units is separated from adjacent electrode units by a separator;
    wherein each electrode unit comprises a positive electrode plate, a negative electrode plate, and a separator; and
    wherein said positive electrode plate is separated from said negative electrode plate by said separator.

12. A battery as recited in claim 2, wherein a cross-sectional shape of said external case is elliptical.

13. A battery as recited in claim 2, wherein said projection is curved.

14. A battery as recited in claim 2, wherein said projection has a conical shape.

15. A battery as recited in claim 2, wherein said lead plate comprises a flexible portion.

16. A battery as recited in claim 15, wherein said flexible portion is capable of flexing towards said projection.

17. A battery as recited in claim 15, wherein:
    a cross-sectional shape of said external case is circular;
    wherein said lead plate is disk shaped and the area of said lead plate is smaller than the cross-sectional area of the inside of said external case; and
    wherein said flexible portion is disposed at a center of said lead plate.

18. A battery as recited in claim 17, wherein:
    said lead plate further comprises holes;
    wherein each hole has projection formed on its periphery; and
    wherein said projections are connected to the electrode assembly.

19. A battery as recited in claim 15, wherein said lead plate is welded to said external case at said flexible portion.

20. A battery as recited in claim 2, further comprising an anti-corrosive coating, wherein said anti-corrosive coating is disposed on an outside surface of said external case.

21. A battery as recited in claim 20, wherein said anti-corrosive coating is conductive.

* * * * *

(12) EX PARTE REEXAMINATION CERTIFICATE (9392nd)
United States Patent
Inoue et al.

(10) Number: US 6,379,839 C1
(45) Certificate Issued: Nov. 2, 2012

(54) BATTERY HAVING WELDED LEAD PLATE

(75) Inventors: Hiroyuki Inoue, Mihara-gun (JP);
Masayuki Terasaka, Tsuna-gun (JP);
Nobukazu Yamanishi, Sumoto (JP);
Shinichirou Matsue, Sumoto (JP);
Hiroshi Hosokawa, Sumoto (JP)

(73) Assignee: Sanyo Electric Co., Ltd.,
Moriguchi-Shi, Osaka (JP)

Reexamination Request:
No. 90/011,586, Apr. 26, 2011

Reexamination Certificate for:
Patent No.: 6,379,839
Issued: Apr. 30, 2002
Appl. No.: 09/384,283
Filed: Aug. 27, 1999

(30) Foreign Application Priority Data

Aug. 31, 1998 (JP) .................................... 10-245119

(51) Int. Cl.
*H01M 2/02* (2006.01)
*H01M 2/20* (2006.01)
*H01M 2/22* (2006.01)

(52) U.S. Cl. .......... 429/176; 429/94; 429/161; 429/163; 429/164; 429/211

(58) Field of Classification Search ....................... None
See application file for complete search history.

(56) References Cited

To view the complete listing of prior art documents cited during the proceeding for Reexamination Control Number 90/011,586, please refer to the USPTO's public Patent Application Information Retrieval (PAIR) system under the Display References tab.

*Primary Examiner* — Norca L Torres Velazquez (57) ABSTRACT

The battery has an electrode assembly inserted into a cylindrical external case. A lead plate connected to the electrode assembly is weld attached to the inner surface of the external case by an energy beam applied from outside the external case. The external case has a projection jutting from its inner surface. The energy beam is applied to the projection from outside the external case and weld attaches the lead plate to the inner surface of the projection.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 8 are determined to be patentable as amended.

Claims 3-7 and 9-21, dependent on an amended claim, are determined to be patentable.

New claim 22 is added and determined to be patentable.

1. A battery comprising:
an electrode assembly;
an external case having a bottom, an inner surface and an outer surface, said external case surrounding said electrode assembly, said inner surface of said external case having an inwardly protruding projection having a first surface area, said outer surface of said external case having an inwardly protruding recess, said recess located so as to correspond with said projection; and
a lead plate having a welding surface area, said lead plate being connected to said electrode assembly, and a portion of said welding surface area being welded to said external case at said first surface area of said projection;
wherein said first surface area is smaller than said welding surface area; *and*
*wherein a side of the lead plate having the welding surface area directly faces the inner surface of the external case such that there are no intervening members between the lead plate and the external case.*

2. A battery comprising:
an electrode assembly;
an external case having a bottom, an inner surface and an outer surface, said external case surrounding said electrode assembly, said inner surface of said external case having an inwardly protruding projection having a first surface area, said outer surface of said external case having an inwardly protruding recess, said recess located so as to correspond with said projection; and
a lead plate having a welding surface area, said lead plate being connected to said electrode assembly, and a portion of said welding surface area being welded to said external case at said first surface area of said projection;
wherein said lead plate is welded to said external case by an energy beam externally applied to said external case; [and]
wherein said first surface area is smaller than said welding surface area; *and*
*wherein the bottom of said external case defines a planar interior surface except at said inwardly protruding projection where said lead plate is welded and fixed to said external case.*

8. A battery [as recited in claim 2,] *comprising:*
*an electrode assembly;*
*an external case having a bottom, an inner surface and an outer surface, said external case surrounding said electrode assembly, said inner surface of said external case having an inwardly protruding projection having a first surface area, said outer surface of said external case having an inwardly protruding recess, said recess located so as to correspond with said projection; and*
*a lead plate having a welding surface area, said lead plate being connected to said electrode assembly, and a portion of said welding surface area being welded to said external case at said first surface area of said projection;*
*wherein said lead plate is welded to said external case by an energy beam externally applied to said external case;*
*wherein said first surface area is smaller than said welding surface area, and*
wherein said projection is located on a side-wall of said external case, *the side wall projecting orthogonally from the bottom of said external case.*

*22. A battery as recited in claim 2, wherein said lead plate is in an inclined position relative to the inner surface of said external case which opposes the side of said lead plate having the welding surface area.*

\* \* \* \* \*